INVENTOR
FROMUND HOCK, KARL LANG, HERIBERT LÜSSEM

United States Patent Office 3,552,857
Patented Jan. 5, 1971

3,552,857
OPTICAL DEVICE FOR THE DETERMINATION OF THE SPACING OF AN OBJECT AND ITS ANGULAR DEVIATION RELATIVE TO AN INITIAL POSITION
Fromund Hock, Wetzlar, Karl Lang, Atzbach, Kreis Wetzlar, and Heribert Lüssem, Braunfels, Kreis Wetzlar, Germany, assignors to Fa. Ernst Leitz GmbH
Filed Apr. 19, 1966, Ser. No. 543,576
Claims priority, application Germany, Apr. 24, 1965, L 50,566
Int. Cl. G01b 11/26; G01n 21/00
U.S. Cl. 356—73
12 Claims

ABSTRACT OF THE DISCLOSURE

A multi-purpose optical measuring device in which an image of an oscillating luminous scanning mark is projected, via a beam splitter and an objective lens, onto a reflecting surface of an object to be located, positioned, or measured, or onto a reflector rigidly connected thereto. The image of the scanning mark, after reflection from the object, is projected through the objective lens and the beam splitter onto an index carrier having a plurality of indices. Said image coacts with said indices to produce optical signals which are indicative of any lateral or angular displacement of the object. An eyepiece and/or a photoelectric transducer are positioned adjacent to the index carrier for evaluation of said signals.

BACKGROUND OF THE INVENTION

This invention relates to a multi-purpose optical measuring device for determining the position or the movement of an object relative to a reference point or a reference direction.

There are a number of measuring devices which serve for the determination of the position of a reference mark placed on the object to be measured. These instruments make use of a beam of light which is caused to oscillate by means of a deflector and impinges on the mark to be located. The result is obtained by a comparison of the different times which elapse between the successive crossings of the mark to be located during the oscillation. It is a disadvantage of these instruments that they can only be used when the object to be measured is provided with marks on its surface.

SUMMARY OF THE INVENTION

It is an object of the invention to provide a multi-purpose optical measuring instrument which, with minor alterations, can be used for: determination of the position or the movement of an object perpendicular to the instrument's axis; determination of the angle of objects inclined to the instrument's axis; measurement of curvature and determination of the eccentricity of revolving shafts.

Briefly, a device according to the present invention is a multi-purpose measuring and/or control device for the visual and/or photoelectric determination of the position or motion of objects of measurement by means of reference marks which either are placed outside of the instrument or as index marks in the interior of same. It comprises at least one movable luminous scanning mark which is oscillated along a path of oscillation. According to the invention the light from this mark penetrates an optical system comprising at least one beam splitter and one objective. After mutual reaction with the object to be measured and reflection from same, the light passes through said objective and said beam splitter and impinges upon an index carrier the indices of which are grouped in such a way that the optical axis penetrates the carrier between two adjacent indices. Means for the evaluation of the result of the measurement are placed adjacent to the index carrier on the side thereof remote from said beam splitter. Said evaluation means may comprise at least one more beam splitter. Numerous types of reflectors can be used as, or affixed to, the object of measurement, such as plane mirrors, reflectors comprising a plurality of planar reflecting elements all of which make the same angle with a common axis, and reflectors shaped like at least part of a surface which is symmetrical with respect to a plane. Examples of reflectors comprising a plurality of plane reflecting surfaces all of which make the same angle with a common axis are triple mirrors, cube corner prisms, and angular mirrors. Examples of reflectors which are shaped like at least part of a surface which is symmetrical with respect to a plane are cylindrical and spherical mirrors, toric mirrors, and convex spherical surfaces in combination with a refracting element the focal point of which lies on the mirror surface. According to another feature of the invention the scanning mark can consist of a luminous element which is not stimulated by heat (e.g., an electroluminescent element or a semiconductor junction). The indices of the index carrier may comprise bodies exhibiting the outer or inner photoelectric effect (including phototransistors) and may respectively be provided with individual output electrodes in order to obtain individual output signals therefrom. By use of image splitting optical means in the area between the scanning mark and the index carrier a plurality of images of the scanning mark may be produced.

In comparison to known devices the present invention has the advantage that only light which is absolutely necessary for the performance of the measurement is transmitted through the instrument, which favorably influences the signal-to-noise ratio in the evaluation means. Moreover, a particularly good contrast is obtained on account of the absence of scattered light rays. Additionally, it is possible to produce the image or the scanning mark at any place of the index carrier so that precise measuring means are only required to cover the distance between two adjacent indices of the index carrier whereas in regard to the complete field of indices the accuracy only depends upon the precision of graduation of the index carrier. The manner in which the invention may be carried out will now be explained with reference to the attached drawings by way of different forms of embodiment.

DESCRIPTION OF THE PREFERRED EMBODIMENTS

Figure 1:
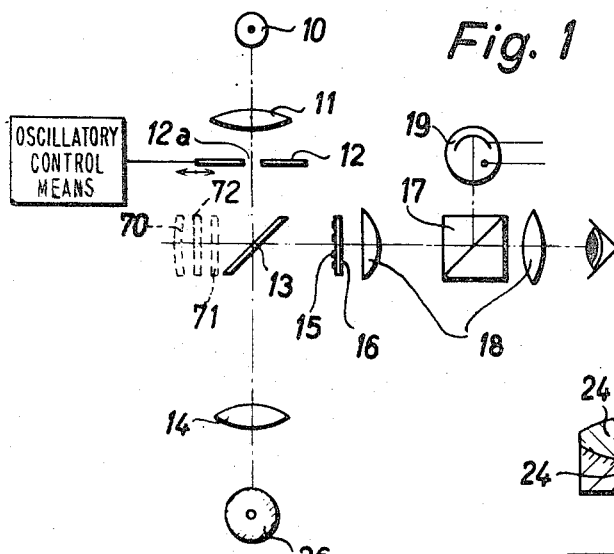
FIG. 1 shows an instrument according to the present invention in the form of a measuring microscope.

In all of the illustrated embodiments, a light source 10 in front of a condenser 11 illuminates a moving diaphragm 12 the slot 12a of which defines the scanning mark. The movement of the diaphragm may for example be oscillating or may consist of a pivoting movement around an axis parallel to the instrument axis in such a way that the scanning mark 12a remains constantly or intermittently in the path of light. The scanning light beam coming thus from the scanning mark 12a is directed onto a reflector via the first beam splitter 13 and the objective 14. The light rays of the beam reflected from the reflector travel backward through the objective 14 and are directed by beam splitter 13 onto the index carrier 16, provided with the indices 15. The image of the index plane of the carrier 16 is, via a second beam splitter 17, produced in an eyepiece 18 as well as on a photoelectric transducer 19. Beam splitter 17 can be a semi-silvered mirror, a conventional device for separating two polarized components or a dichroic device for splitting the beam as a function of wave length.

FIG. 1 shows an embodiment in which an inclined semi-transparent plate 13 serves as the first beam splitter and a microscope objective 14 is used for an objective. It is advisable to choose the length of and locate the path of oscillation of the scanning mark 12a in such a way that the image of the scanning mark 12a on the index carrier 16 remains between two adjacent indices 15 and has its center of oscillation halfway between them. A reflecting cylinder 26 with a generating line parallel to the scanning mark 12a is used for a reflector in this case. By moving the image of the scanning mark 12a across the surface of the cylinder a modulation of the reflected light rays reaching index carrier 16 takes place because the light rays will not re-enter objective 14 when the image of scanning mark 12a is produced on a portion of said cylinder remote from the highest element thereof. Deviations in the location of the cylinder from the instrument axis as defined by the center of oscillation of the scanning mark 12a and the lower principal point of the objective 14 are received photoelectrically and evaluated by an electronic device. The eyepiece 18 permits observation of a measurement or of an adjusting of the instrument. Means for the evaluation of the signals produced by photosensitive element 19 are known in the prior art and need not be described herein.

Figure 1A:
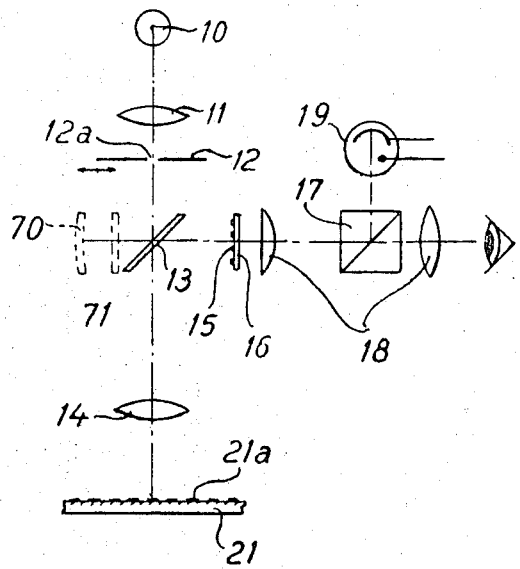
FIG. 1a shows an instrument according to the present invention used to locate the graduations of a scale or to interpolate therebetween.
Figure 4A:
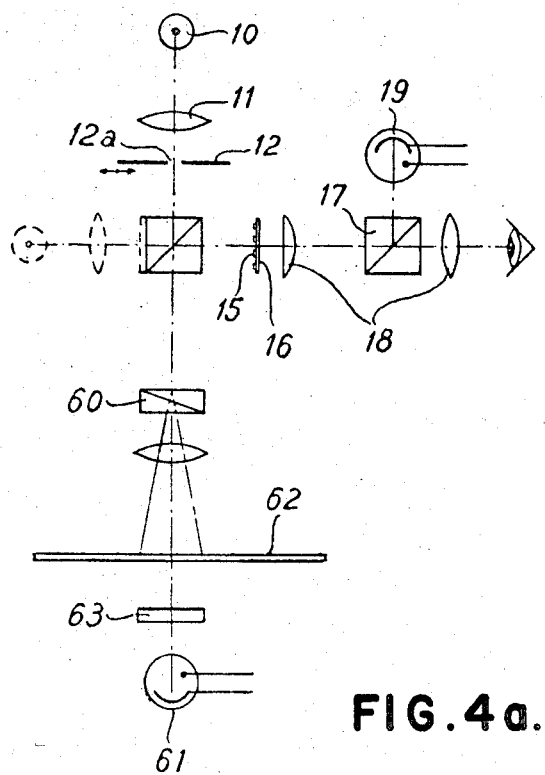
FIG. 4a shows an instrument according to the present invention with auxiliary photoelectric means for rapidly registering scale marks or spectral lines with the main axis of the measuring instrument.

FIG. 1a illustrates the use of the instrument of the invention for precise determination of the position of a light-absorbing graduation 21a on graduated scale 21 with respect to the optical axis of the instrument. The location and length of the path of oscillation of scanning mark 12a is so chosen that the image of mark 12a on the mark carrier 16 remains between two marks 15. When the image of mark 12a passes over a graduation 21a the light reflected to mark carrier 16 is reduced. The electrical signal emitted by photoelectric cell 19 is evaluated by a well-known means either for control purposes or to indicate the position of mark 21a on well-known indicating means.

Figure 3:
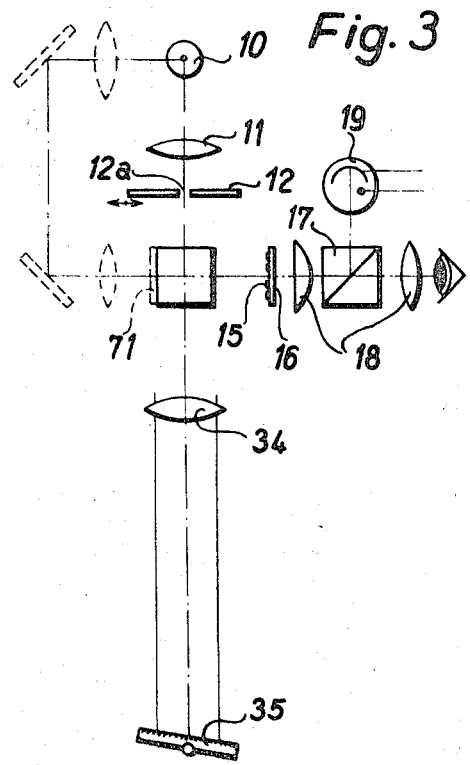
FIG. 3 shows an instrument according to the present invention in the form of an autocollimator.
Figure 3A:
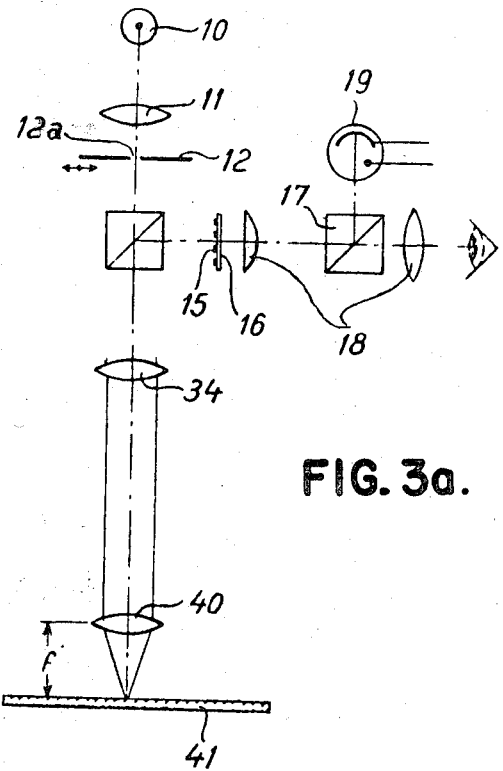
FIG. 3a shows an instrument according to the present invention adapted to determine the angle between a remotely located reflector and the principal axis of the instrument.

FIG. 3a shows the device of the invention in the form of a telescopic magnifier. The basic construction corresponds to that of FIG. 3, but an optical system 40 is additionally inserted in this embodiment, a reflector being positioned in the focal plane thereof.

FIG. 42 shows an instrument according to the invention in which a Wollaston prism 60 is inserted in the beam path and serves to produce two separate, differently polarized images of mark 12a at an exposed spectrographic plate 62. An analyzer 63 assures that only one of these images will be sensed by the auxiliary photoelectric transducer 61. The output signals of this transducer may be used for the coarse positioning of plate 62, so that the irregularly-spaced spectral lines thereon may successively be quickly brought into registration with the axis of the optical system, whereafter the more precise but slow-acting measuring system comprising photoelectric transducer 19 may locate these lines with greater precision. Thus, there may be provided according to the invention a fast-acting, high-precision analyzer for spectrographic plates and the like.

Figure 2:
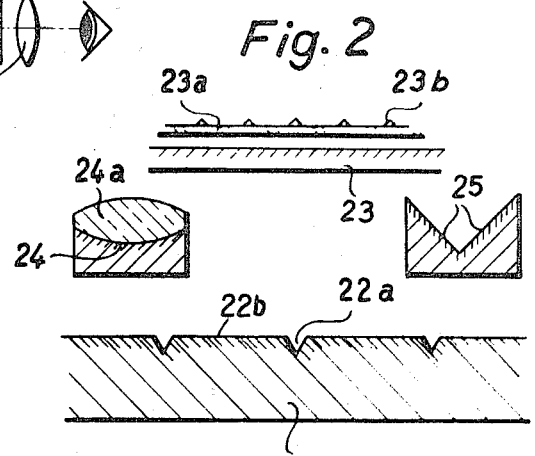
FIG. 2 shows additional embodiments of the reflector.

FIG. 2 shows additional embodiments of the reflector. The reflector 22, for instance, consists of a carrier 22b which is provided with groove-like marks 22a. Their reflecting planks are inclined in such a way that the light reflected from them cannot re-enter the aperture of the objective 14. Return of the light rays into the aperture is only possible if the rays impinge upon the reflecting area surrounding the grooves.

Another embodiment of the reflector is designated in FIG. 2 by the numeral 23. This reflector 23 is covered by a transparent index carrier 23a bearing light-absorbing marks 23b. In this case the modulation of the light coming from the scanning mark 12a is caused by the marks 23b which are located in the image plane of the objective 14. The light within the field of the objective which during the scanning bypasses one of the indices 23b will be reflected by the reflector into the objective aperture.

A concave mirror 24 also shown in FIG. 2 may be used to advantage if a work piece has no marks whatsoever and displacements of said work piece in a plane are to be checked upon. The reflector 24 together with a refracting optical element 24a has telecentric qualities. The concave mirror 24 is placed upon the work piece and in case of displacements of this work piece from the optical axis of the instrument mirror 24 produces a double deviation of the image of scanning mark 12a on the index carrier 16 owing to the 1:1 image forming quality of the concave mirror. If the reflector is, for instance, placed on the face place of a revolving shaft the eccentricity in one direction of the shaft may be measured and can be fed into a control loop not shown.

The concave mirror is placed upon the work piece in such a way that the scanning mark 12a is imaged by the concave mirror in the ratio 1:1. If the optical axis of the concave mirror coincides with the optical axis of the instrument the image of the scanning mark 12a is reproduced in itself and impinges after reflection from the beam splitter 13 upon the spot on the index carrier 16 which corresponds to the zero position. If the concave mirror is moved in a lateral direction by a distance $x$ the image produced by the concave mirror will move by a double distance $2x$. This image of the scanning mark 12a, enlarged by the objective 14, travels across the indices 15 in synchronism with the movement of the diaphragm 12. This causes the modulation of the light flux which contains the result of the measurement.

If greater displacements of the work piece are to be measured a 90° roof or cube corner prism 25 may be used, especially instead of a non-telecentric concave mirror system. The roof edge of the prism should be maintained perpendicular to direction of the movement, perpendicular to the optical axis of the instrument, and parallel to the scanning mark. It should also be located in the plane of the image of the scanning mark 12a as produced by the objective 14.

The image of the scanning mark 12a is always produced in the plane of symmetry of the edge of the reflector. In case this edge does not coincide with the optical axis of the instrument, the image of the scanning mark 12a will still appear in the symmetrical plane of the reflector. Thus, if the principal ray of the image forming beam enters at a distance $y$ from the plane of symmetry, the diverging beam of light after focusing leaves the reflector in such a way that now the principal ray of this light beam runs parallel to the impinging principal ray at a distance $2y$ from the latter. This causes the image virtually to move laterally with double velocity.

In place of the reflectors hitherto mentioned, convex mirrors may also be used to advantage, if their center of curvature lies in the image plane of the scanning mark 12a. Here the convex mirror may simultaneously perform the function of a mechanical feeler-ball.

The objective 34 as shown in FIG. 3 represents a telescope objective. As a reflector, a flat autocollimation mirror 35 is used and the indices on the carrier 16 correspond to different angles. The functioning as an autocollimation telescope of the so designed instrument is similar to what has been explained above. If this instrument is to be used as a refractometer the mirror has to be connected rigidly with the instrument at such a distance that between the instrument itself and the mirror at least one prismatic cell can be inserted. Instead of the rigidly mounted mirror the rear wall of the cell may be used as reflector if coated with a reflecting layer.

Figure 4:
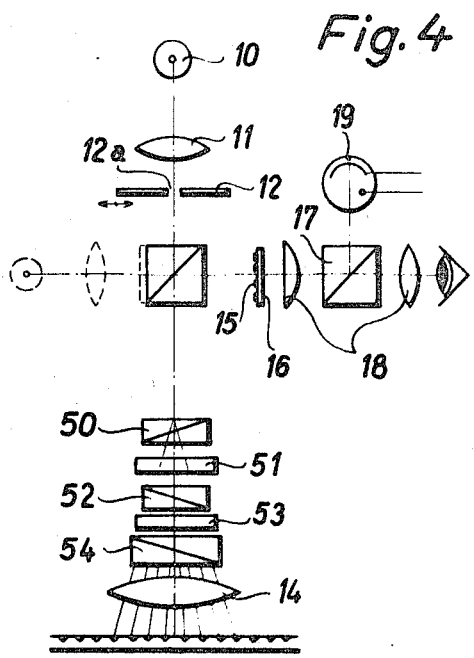
FIG. 4 shows an embodiment of the invention for producing the mean value of $2^n$ indices.

FIG. 4 shows how a measurement may be performed averaging the positions of several indices provided on the reflector. Into the path of the light a Wollaston-prism 50 is introduced that splits the light beam in two parts. If a division of the original light rays into a greater number of parts is desired more Wollaston-prisms have to be introduced together with circular polarizing quarter-wave plates or optically active plates which cause a 45° delineation. Examples of these are quartz plates 51 and 53.

If only one Wollaston-prism is used, two images of the scanning mark 12a in synchronous movement are obtained, the separation of which is governed by the focal length of the objective 14 and the splitting angle of the prism. The two images are polarized perpendicularly to each other. Owing to this fact the two image producing light fluxes are separable and distinguishable from each other. By means of two photoelectric transducers a control signal may be obtained in addition to the measuring signal.

It is advisable to provide means by which the amplitude and/or number of oscillations per time unit of the scanning mark may be varied. This means is shown schematically in FIG. 1. It is thus possible to control the amplitude and/or the number of oscillations per time unit or to control them as a function of a signal obtained from the photosensitive element 19.

It is also possible to form the indices 15 on the carrier 16 differently from each other, for instance corresponding to a code, so that each scanned index simultaneously indicates its value. Also the indices 15 can themselves be photosensitive elements so that each illuminated index is marked by a change of its electric properties.

Another variation in the design of the herein described multi-purpose measuring instrument can be achieve by using a self-luminous element in the place of the diaphragm 12, for instance a semi-conductor with light emitting junctions which moves in the same way as the diaphragm. In this case the light source 10 as well as the condenser 11 can be dispensed with and the light intensity can be modulated easily by a higher frequency.

As shown in FIGS. 1 and 3, additional optical means may be provided in order to afford additional illumination of the plane of the index carrier 16. As shown in FIG. 1, a concave mirror 70 may be mounted in line with the optical axis of the beam splitter 17, but on the opposite side of beam splitter 13. This concave mirror reflects one part of the rays which are deflected laterally from the first beam splitter 13 onto the index carrier 16 via said beam splitter 13. By insertion of a filter 71 it may be insured that this additional illumination has no effect on the photoelectric transducer. Slide 72 is marked with additional auxiliary indices or numerals, for instance indices of tolerance, which are projected onto carrier 16. These additional marks may also be movable relative to the image of scanning mark 12a for measuring purposes.

This additional illumination, however, may also be achieved by providing an additional light source as shown in dotted lines in FIG. 4. Another possibility of additionally illuminating the index carrier 16 consists of optical means, as for instance mirrors, lenses or light guiding means by which the unutilized rays from light source 10 are used for this additional illumination.

What we claim is:

1. An optical measuring device for determining the distance and angular deviation of an object from an initial position comprising:
   a light source;
   means masking the light from the source to produce at least one luminous hair-like scanning mark;
   means for oscillating the mark producing means in a direction perpendicular to the path of light emanating from the source;
   light reflecting means mounted to the object for modulating incident light in response to object displacement, the reflecting means being positioned in spaced relation to the mark producing means so that the scanning mark is incident thereon;
   beam splitting means positioned in the light return path of the reflecting means for producing a second path of reflection;
   a photosensitive transducer positioned in optical communication with the second reflection path for detecting changes in reflected light proportional to object displacement;
   and an index carrier provided with index marks positioned in the second reflection path, the marks being employed to restrict arcuate sweep of the second reflection path between predetermined marks.

2. The apparatus of claim 1, together with visual means optically communicating with the index carrier for visually evaluating object displacement.

3. The apparatus of claim 2, together with a second beam splitting means optically positioned in parallel with the photosensitive transducer and the visual means for directing optical signals to both from the index carrier.

4. A device as set forth in claim 1, at least some of said index marks including photosensitive elements, for generating associated electrical output signals.

5. A multi-purpose optical measuring device as set forth in claim 1, including $n$ beam splitting and polarizing means and $n-1$ circular polarizing or depolarizing optically active means producing $2^n$ images of said scanning mark on said reflecting means.

6. A device as set forth in claim 1, including means for additionally illuminating said index carrier, said reflecting means being a spherical mirror.

7. A device as set forth in claim 6, including filter means in the light ray path of the additional illumination.

8. A device as set forth in claim 7, said means for additionally illuminating including image forming auxiliary optical means to project additional auxiliary marks, said auxiliary marks being measurably movable and exchangeable.

9. A multi-purpose optical device as set forth in claim 2, together with polarizing means for allowing only rays polarized in one direction to reach said transducer.

10. A multi-purpose optical measuring device as set forth in claim 3, said second beam splitter means being dichroid and separating said optical signals into two spectrally distinct parts, one of which is transmitted to the photosensitive means.

11. A device as in claim 1, said object including a reflector having non-reflecting index marks spaced on its reflecting surface.

12. A multi-purpose optical measuring device as claimed in claim 1 in which said object comprises reflecting means including a plurality of planar reflecting surfaces all of which make the same angle with a common axis.

(References on following page)

References Cited

UNITED STATES PATENTS

| | | | |
|---|---|---|---|
| 2,998,746 | 9/1961 | Gievers | 88—14 |
| 3,106,127 | 10/1963 | Koller | 88—24 |
| 3,317,739 | 5/1967 | Larraburn et al. | 250—232 |
| 3,331,964 | 7/1967 | Heinecke et al. | 250—232 |
| 3,381,570 | 5/1968 | Anway et al. | 88—14 |

FOREIGN PATENTS

| | | | |
|---|---|---|---|
| 684,435 | 12/1952 | Great Britain | 88—14 |
| 1,006,698 | 10/1965 | Great Britain | 88—14 |

RONALD L. WIBERT, Primary Examiner

J. ROTHENBERG, Assistant Examiner

U.S. Cl. X.R.

250—237; 356—118, 138, 152, 172